US011334145B2

(12) United States Patent
Sawyer et al.

(10) Patent No.: US 11,334,145 B2
(45) Date of Patent: *May 17, 2022

(54) SENSORY FEEDBACK SYSTEMS AND METHODS FOR GUIDING USERS IN VIRTUAL REALITY ENVIRONMENTS

(71) Applicant: Valve Corporation, Bellevue, WA (US)

(72) Inventors: David Sawyer, Bellevue, WA (US);
Kenneth Birdwell, Bellevue, WA (US);
Kenneth Barnett, Bellevue, WA (US);
Tristan Reidford, Bellevue, WA (US);
Aaron Leiby, Seattle, WA (US); Emily Ridgway, Bellevue, WA (US);
Alexander C. Vlachos, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,422

(22) Filed: Mar. 14, 2019

(65) Prior Publication Data

US 2019/0212812 A1 Jul. 11, 2019

Related U.S. Application Data

(63) Continuation of application No. 14/933,955, filed on Nov. 5, 2015, now Pat. No. 10,241,566.
(Continued)

(51) Int. Cl.
*G06F 3/01* (2006.01)
*G02B 27/01* (2006.01)
*G02B 27/00* (2006.01)

(52) U.S. Cl.
CPC .......... *G06F 3/011* (2013.01); *G02B 27/0093* (2013.01); *G02B 27/017* (2013.01); *G02B 2027/014* (2013.01); *G02B 2027/0167* (2013.01)

(58) Field of Classification Search
CPC .............................. G06F 3/011; G02B 27/017
See application file for complete search history.

(56) References Cited

U.S. PATENT DOCUMENTS 5,892,462 A 4/1999 Tran
5,900,849 A 5/1999 Gallery
(Continued)

FOREIGN PATENT DOCUMENTS

CN 102099767 6/2011
CN 102722249 A 10/2012
(Continued)

OTHER PUBLICATIONS

Office Action from the European Patent Office for Application No. 15857384.0, dated Nov. 18, 2019, a counterpart foreign application of U.S. Pat. No. 10,241,566, 7 pages.
(Continued)

*Primary Examiner* — Ryan R Yang
(74) *Attorney, Agent, or Firm* — Lee & Hayes, P.C.

(57) ABSTRACT

Sensory feedback ("chaperoning") systems and methods for guiding users in virtual/augmented reality environments such as walk-around virtual reality environments are described. Exemplary implementations assist with preventing collisions with objects in the physical operating space in which the user acts, among other potential functions and/or uses.

20 Claims, 12 Drawing Sheets

Related U.S. Application Data

(60) Provisional application No. 62/075,742, filed on Nov. 5, 2014, provisional application No. 62/126,695, filed on Mar. 1, 2015.

(56) References Cited

U.S. PATENT DOCUMENTS

| | | | |
|---|---|---|---|
| 6,581,546 | B1 * | 6/2003 | Dalland ............... A01K 15/023 |
| | | | 119/712 |
| 7,403,101 | B2 | 7/2008 | Kropinski et al. |
| 7,741,961 | B1 | 6/2010 | Rafii et al. |
| 8,049,644 | B1 | 11/2011 | Oehlert et al. |
| 9,761,163 | B2 | 9/2017 | Ohyama et al. |
| 2005/0123171 | A1 | 6/2005 | Kobayashi et al. |
| 2010/0156906 | A1 | 6/2010 | Montgomery et al. |
| 2010/0222099 | A1 | 9/2010 | Fields |
| 2012/0262558 | A1 | 10/2012 | Boger et al. |
| 2013/0083007 | A1 | 4/2013 | Geisner et al. |
| 2013/0084970 | A1 | 4/2013 | Geisner et al. |
| 2013/0293586 | A1 | 11/2013 | Kaino et al. |
| 2013/0328928 | A1 | 12/2013 | Yamagishi et al. |
| 2013/0335301 | A1 | 12/2013 | Wong et al. |
| 2014/0121966 | A1 * | 5/2014 | Iaccarino ........... G01C 21/3614 |
| | | | 701/533 |
| 2014/0198017 | A1 | 7/2014 | Lamb et al. |
| 2014/0354692 | A1 | 12/2014 | Ng-Thow-Hing et al. |
| 2015/0091451 | A1 | 4/2015 | Williams |
| 2015/0116806 | A1 | 4/2015 | Mizoguchi et al. |
| 2016/0152184 | A1 | 6/2016 | Ogawa et al. |

FOREIGN PATENT DOCUMENTS

| | | |
|---|---|---|
| CN | 103480154 | 1/2014 |
| CN | 103761085 | 4/2014 |
| CN | 103975268 | 8/2014 |
| JP | 2005165848 | 6/2005 |
| JP | 2006301924 | 11/2006 |
| JP | 2012155655 | 8/2012 |
| JP | 2013257716 | 12/2013 |
| WO | WO2012176201 | 12/2012 |

OTHER PUBLICATIONS

Translated Office Action from the Japanese Patent Office for Application No. 2017-544546, dated Mar. 26, 2019, a counterpart foreign application of U.S. Pat. No. 10,241,566, 6 pages.

Extended European Search Report (in English) of European Patent App. No. 15857384 (PCT/US2015/059329), dated Apr. 25, 2016, search completion Apr. 10, 2018 from European Patent Office (EPO).

The Japanese Office Action dated Dec. 18, 2018 for Japanese Patent Application No. 2017-544546, a counterpart of U.S. Appl. No. 14/933,955, 8 pages.

Office Action for U.S. Appl. No. 14/933,955, dated Feb. 7, 2018, "Sensory Feedback Systems and Methods for Guiding Users in Virtual Reality Environments", Sawyer, et al., 7 pages.

Office Action for U.S. Appl. No. 14/933,955, dated Jun. 14, 2018, "Sensory Feedback Systems and Methods for Guiding Users in Virtual Reality Environments", Sawyer, et al., 17 pages.

Office Action for U.S. Appl. No. 14/933,955, dated Sep. 8, 2017, "Sensory Feedback Systems and Methods for Guiding Users in Virtual Reality Environments", Sawyer, et al., 5 pages.

PCT Search Report (in English) & Written Opinion for Int App. No. PCT/US2015/059329, dated Jan. 28, 2016, search completed Dec. 28, 2015 from ISA/US, 5 pages.

Translated Office Action from the Chinese Patent Office for Application No. 201580072357.3, dated Apr. 27, 2020, a counterpart foreign application of U.S. Pat. No. 10,241,566, 13 pgs.

English Translation of the Chinese Office Action dated Sep. 27, 2020 for Chinese Patent Application No. 201580072357.3, a counterpart of U.S. Pat. No. 10,241,566, 9 pages.

* cited by examiner

SENSORY FEEDBACK SYSTEMS AND METHODS FOR GUIDING USERS IN VIRTUAL REALITY ENVIRONMENTS

CROSS-REFERENCE TO RELATED APPLICATIONS

This application is a continuation of, and claims priority to, co-pending commonly owned U.S. patent application Ser. No. 14/933,955 entitled, "SENSORY FEEDBACK SYSTEMS AND METHODS FOR GUIDING USERS IN VIRTUAL REALITY ENVIRONMENTS" and filed on Nov. 5, 2015, which claims the benefit of Provisional Application Ser. Nos. 62/075,742, filed on Nov. 5, 2014, and 62/126,695, filed on Mar. 1, 2015, all of which are incorporated herein by reference.

BACKGROUND OF THE DISCLOSURE

1. Field of the Disclosure

The disclosure relates generally to sensory feedback systems and methods for guiding users in virtual/augmented reality environments such as walk-around virtual reality environments and for assisting with preventing collisions with objects in the physical operating space in which the user acts.

2. General Background

Various augmented and/or virtual reality systems and/or environments are known. One current generation of desktop virtual reality ("VR") experiences is created using head-mounted displays ("HMDs"), which can be tethered to a stationary computer (such as a personal computer ("PC"), laptop, or game console), or self-contained. Such desktop VR experiences generally try to be fully immersive and disconnect the users' senses from their surroundings.

Collisions with physical objects when using a walk-around virtual reality system are currently solved in certain situations by either having a second person in the operating space (a "chaperone") guiding the user, and/or by providing physical hints (e.g., by placing a thick carpet on the floor that ends some distance from the adjacent walls).

It is desirable to address the current limitations in this art.

BRIEF DESCRIPTION OF THE DRAWINGS

By way of example, reference will now be made to the accompanying drawings, which are not to scale.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Reference will now be made in detail to specific implementations of the present invention as illustrated in the accompanying drawings. The same reference numbers will be used throughout the drawings and the following description to refer to the same or like parts.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Figure 1:
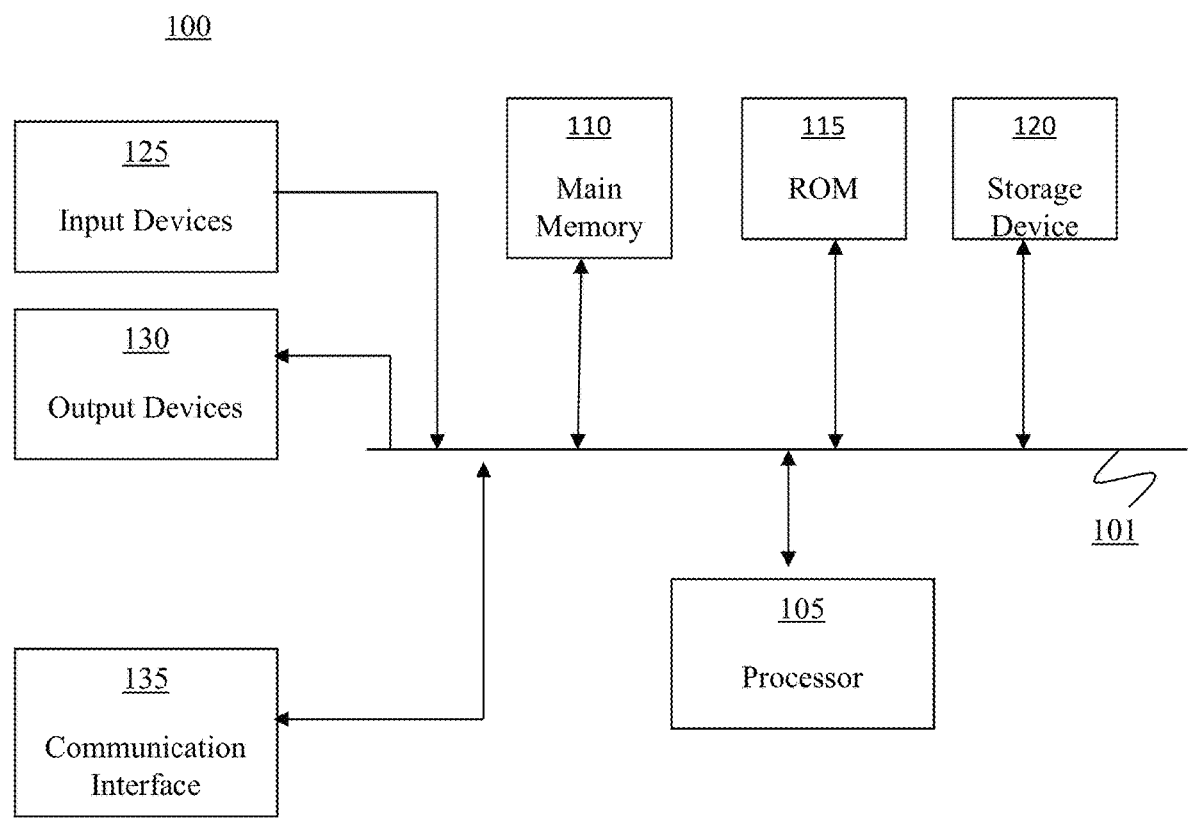
FIG. 1 is an exemplary diagram of a computing device that may be used to implement aspects of certain embodiments of the present invention.

FIG. 1 is an exemplary diagram of a computing device 100 that may be used to implement aspects of certain embodiments of the present invention. Computing device 100 may include a bus 101, one or more processors 105, a main memory 110, a read-only memory (ROM) 115, a storage device 120, one or more input devices 125, one or more output devices 130, and a communication interface 135. Bus 101 may include one or more conductors that permit communication among the components of computing device 100. Processor 105 may include any type of conventional processor, microprocessor, or processing logic that interprets and executes instructions. Main memory 110 may include a random-access memory (RAM) or another type of dynamic storage device that stores information and instructions for execution by processor 105. ROM 115 may include a conventional ROM device or another type of static storage device that stores static information and instructions for use by processor 105. Storage device 120 may include a magnetic and/or optical recording medium and its corresponding drive. Input device(s) 125 may include one or more conventional mechanisms that permit a user to input information to computing device 100, such as a keyboard, a mouse, a pen, a stylus, handwriting recognition, voice recognition, biometric mechanisms, and the like. Output device(s) 130 may include one or more conventional mechanisms that output information to the user, including a display, a projector, an A/V receiver, a printer, a speaker, and the like. Communication interface 135 may include any transceiver-like mechanism that enables computing device/server 100 to communicate with other devices and/or systems. Computing device 100 may perform operations based on software instructions that may be read into memory 110 from another computer-readable medium, such as data storage device 120, or from another device via communication interface 135. The software instructions contained in memory 110 cause processor 105 to perform processes that will be described later. Alternatively, hardwired circuitry may be used in place of or in combination with software instructions to implement processes consistent with the present invention. Thus, various implementations are not limited to any specific combination of hardware circuitry and software.

In certain embodiments, memory 110 may include without limitation high-speed random access memory, such as DRAM, SRAM, DDR RAM or other random access solid state memory devices; and may include without limitation non-volatile memory, such as one or more magnetic disk storage devices, optical disk storage devices, flash memory devices, or other non-volatile solid state storage devices. Memory 110 may optionally include one or more storage devices remotely located from the processor(s) 105. Memory 110, or one or more of the storage devices (e.g., one or more non-volatile storage devices) in memory 110, may include a computer readable storage medium. In certain embodiments, memory 110 or the computer readable storage medium of memory 110 may store one or more of the following programs, modules and data structures: an operating system that includes procedures for handling various basic system services and for performing hardware dependent tasks; a network communication module that is used for connecting computing device 110 to other computers via the one or more communication network interfaces and one or more communication networks, such as the Internet, other wide area networks, local area networks, metropolitan area networks, and so on; a client application that may permit a user to interact with computing device 100.

Certain embodiments of the present invention comprise a trackable head-mounted display ("HMD") with at least three degrees of freedom in an operating space and optionally one or more sensors with at least two degrees of freedom of positional tracking. The HMD and the optional sensors provide sensory input to a controller, which in turn provides sensory feedback to the HMD or another output device. Without limitation, the HMD may be tethered to a stationary computer (such as a personal computer ("PC"), laptop, or game console), or alternatively may be self-contained (i.e., with some or all sensory inputs, controllers/computers, and outputs all housed in a single head-mounted device).

Figure 2:
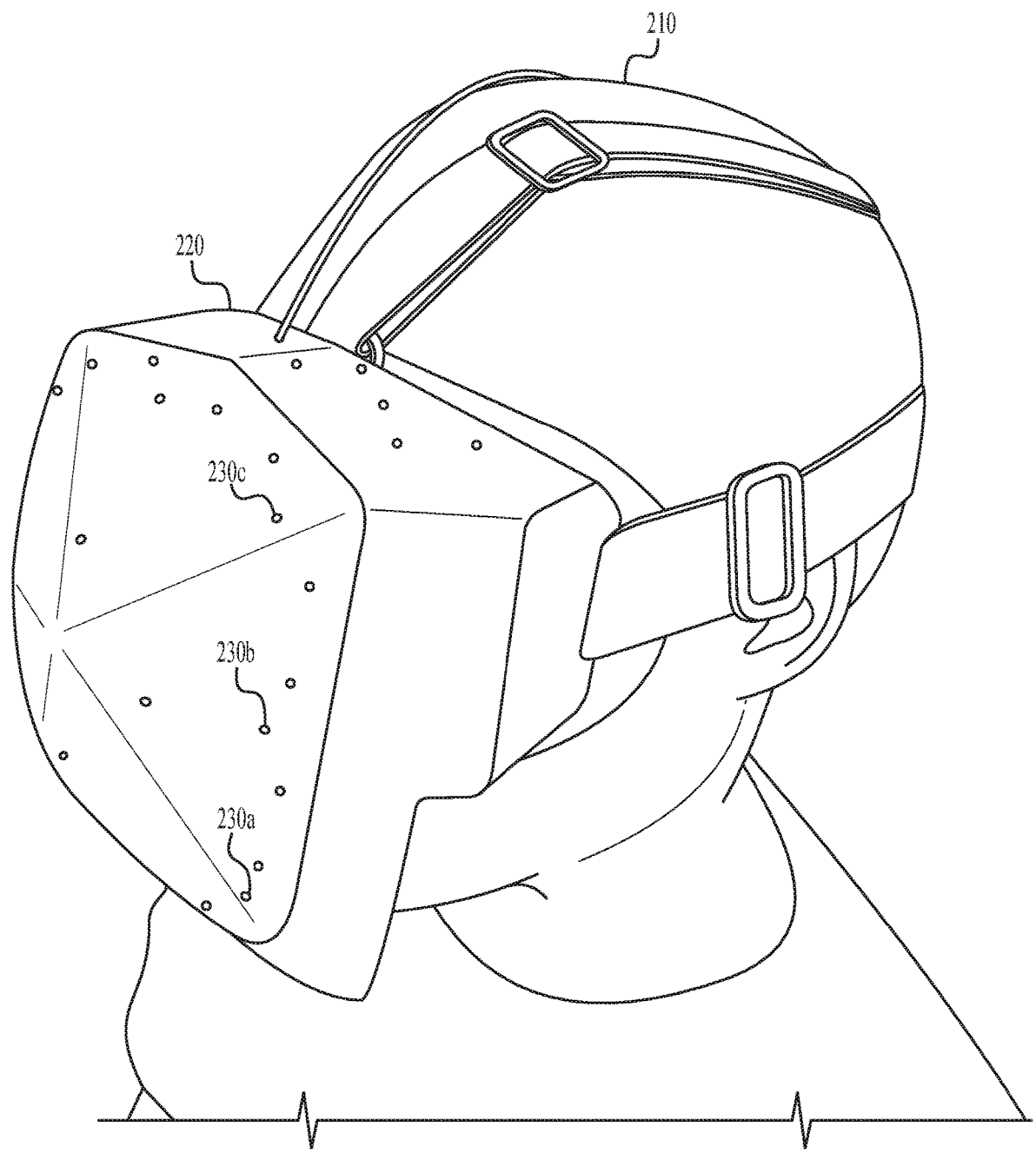
FIG. 2 is an exemplary diagram of a human user wearing a head-mounted virtual reality apparatus comprising optical receivers and sensors that may be used to implement aspects of certain embodiments of the present invention.

FIG. 2 is an exemplary diagram of a human user (210) wearing a head-mounted virtual reality apparatus (220) comprising optical receivers and sensors (230a, 230b, 230c, etc.) that may be used to implement aspects of certain embodiments of the present invention.

Figure 3:
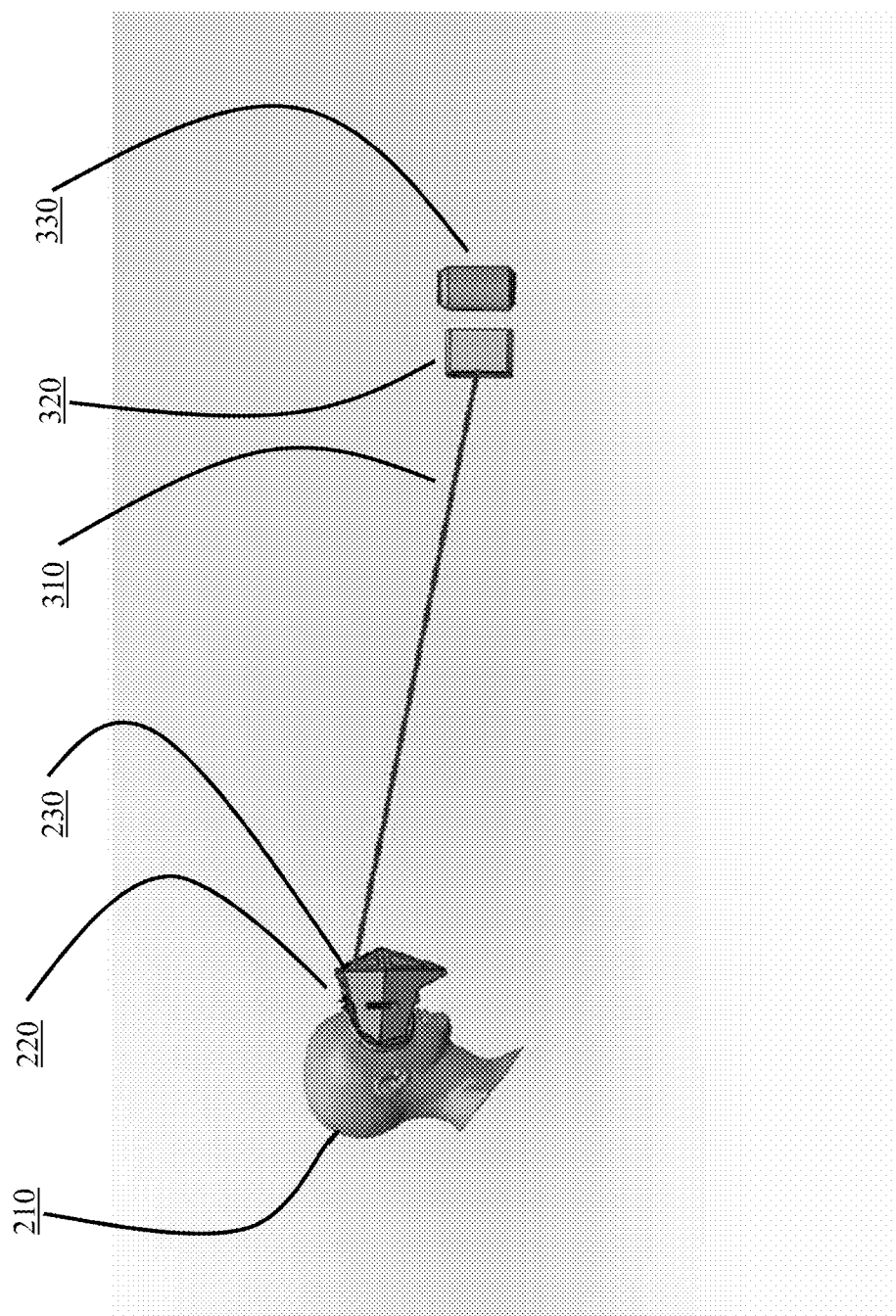
FIG. 3 is an exemplary diagram of a transmitter/receiver configuration in an optical positional tracking system that may be used to implement aspects of certain embodiments of the present invention.

FIG. 3 is an exemplary diagram of a transmitter/receiver configuration in an optical positional tracking system that may be used to implement aspects of certain embodiments of the present invention. As depicted in FIG. 3, an exemplary optical positional tracking system comprises a base station (320) that sweeps an optical signal (310) across the tracking volume. Depending on the requirements of each particular implementation, more than one base station may be incorporated, and each base station may generate more than one optical signal. For example, while a single base station is typically sufficient for six-degree-of-freedom tracking, multiple base stations may be necessary in some embodiments to provide robust room-scale tracking for headsets and peripherals. Optical receivers (e.g., 230) are incorporated into the head-mounted virtual reality apparatus (220) or other tracked objects. In certain embodiments, optical receivers are paired with an accelerometer and gyroscope Inertial Measurement Unit ("IMU") on each tracked device to support low-latency sensor fusion. As shown in FIG. 3, a standard 12-ounce soda or beer car (330) is depicted to provide a sense of scale.

Each base station (320) according to certain embodiments contains two rotors, which sweep a linear beam (310) across the scene on orthogonal axes. At the start of each sweep cycle, the base station (320) according to certain embodiments emits an omni-directional light pulse ("sync signal") visible to all sensors. Thus, each sensor computes a unique angular location in the swept volume by timing the duration between the sync signal and the beam signal. Sensor distance and orientation is solved using multiple sensors affixed to a single rigid body.

Depending on the particular requirements of each implementation, various other tracking systems may be integrated, using techniques that are well known by skilled artisans.

Figure 4:
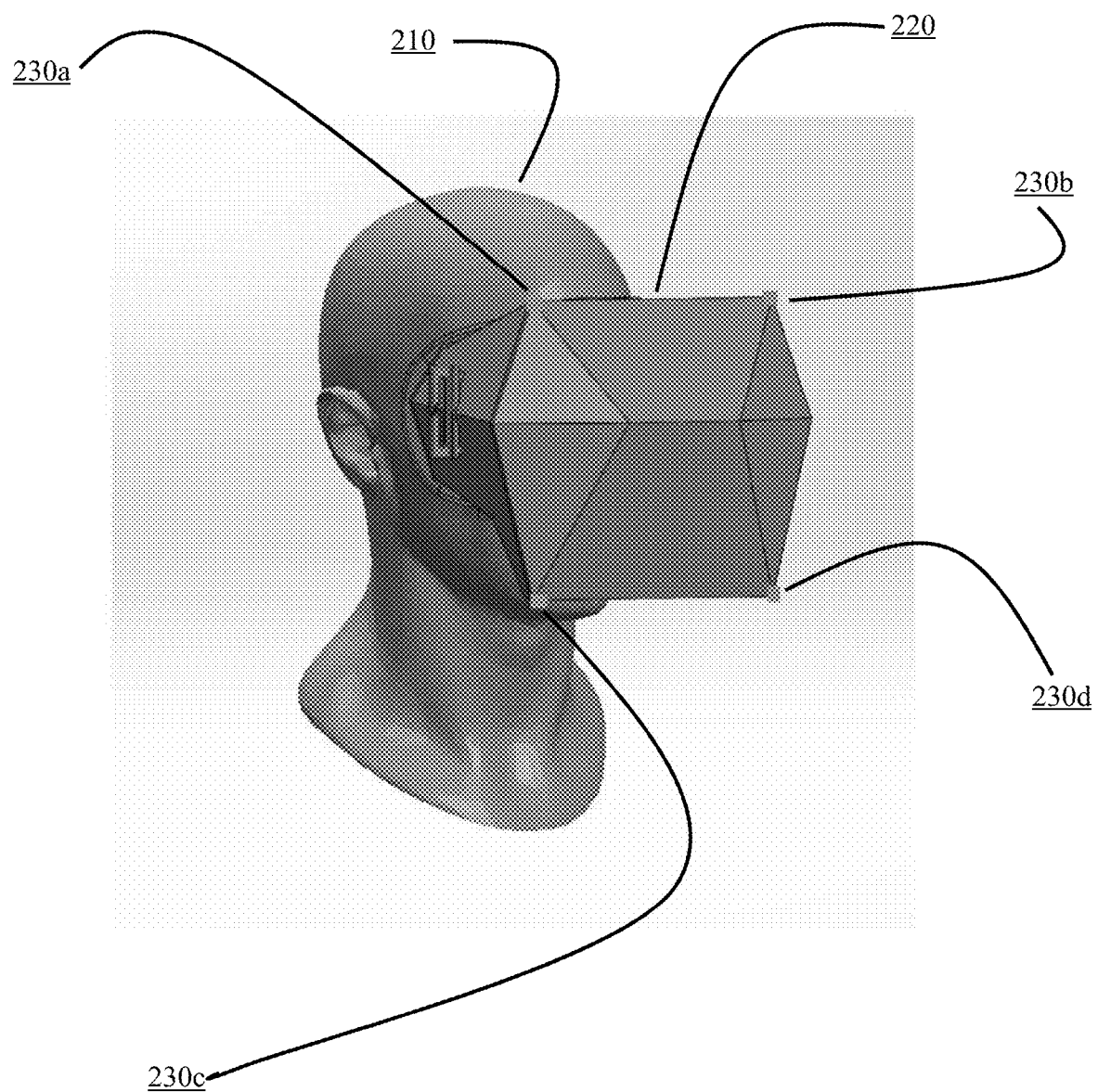
FIG. 4 is an exemplary diagram of a head-mounted virtual reality display with four optical receivers that may be used to implement aspects of certain embodiments of the present invention.

FIG. 4 is an exemplary diagram of a head-mounted virtual reality display (220) with four optical receivers (230a, 230b, 230c, 230d) that may be used to implement aspects of certain embodiments of the present invention.

The HMD in certain embodiments presents the user a dynamic virtual environment ("virtual space"). It is tracked in operating space so that its user's motions in the operating space are translated to the representation of the virtual space. When the HMD or an optional additional sensor close in on physical obstacles in the operating space, such as walls or furniture, a sensory feedback is provided to the user either in the virtual space or in the operating space in order to avoid a collision.

In certain exemplary embodiments the system is primed by the user in advance by defining the boundaries and limitations of the operating space through one or more methods of programmatic input ("Soft Bounds"). In others, the system automatically detects actual obstacles in space through one or more sensor technologies ("Hard Bounds").

A controller according to aspects of certain embodiments receives and processes detection signals from the HMD and/or external sensors and generates corresponding feedback to the user based on the proximity of Soft Bounds and/or Hard Bounds and/or based on explicit user request for feedback (e.g., an "overlay button").

Without limitation, definition of Soft Bounds can be made in the following ways (including combinations), depending on the requirements of each particular implementation:
- By entering data in a computer by means of mouse and keyboard;
- By moving a tracked object (HMD or other worn sensors such as a game controller) to the n corners of the operating space; and/or
- By wearing a tracked HMD in one location, looking (either physical rotation of the HMD or rotation of the eyeball if the HMD has gaze-tracking technology) at each of the n corners of the operating space from at least two places in the operating space (triangulating the corner that is looked at).

Without limitation, definitions of Hard Bounds can be made in the following ways (including combinations), depending on the requirements of each particular implementation:
- By using a depth camera attached to the HMD or external to it; and/or
- By using other sensors for measuring distances such as lasers or ultrasound.

Without limitation, sensory feedback can be given in the following ways (including combinations), depending on the requirements of each particular implementation:
- a warning sound;
- haptic feedback (rumble or actuators included in the HMD or another wearable device such as a game controller held by the user);
- visual warning signs displayed in the HMD;
- a CG-rendered overlay of the Soft Bounds displayed in the HMD superimposed over the virtual environment;
- a pass-through video signal of one or more cameras mounted on the HMD; and/or
- a custom application program interface ("API") trigger sent to the controller of the virtual environment, meaning that the dimensions of the virtual environment are automatically adjusted to the physical environment and/or a custom warning specific to the virtual environment is made (e.g., an in-game character tells the user to stop walking when the user approaches the boundaries of the operating space).

Any of the above systems and methods may be implemented either as a digital warning signal that is triggered as a user crosses a predefined threshold, or as an analog warning that increases in intensity (e.g., overlay of room bounds fades in in brightness the closer a user gets to an obstacle and gets supported by a rumbling sensation increasing in intensity as user gets even closer).

One embodiment allows the user to dynamically reposition his or her virtual representation in the virtual space so as to be able to experience a larger area of the virtual environment than what is provided by his or her operating space. In one such exemplary embodiment, the operating space is a 3-meter by 3-meter square. The virtual environment is a room several times the size of this operating space. In order to experience all of it, a user could trigger a reposition of his representation in the virtual environment. In this example, the user could move around and rotate a "ghosted" virtual representation of him or herself and a 3-meter by 3-meter square projected onto the ground of the virtual environment. Upon accepting the repositioned space, the user would be "teleported" to his or her new place in the virtual environment and could continue moving around this new part of the virtual environment by physically moving in his or her operating space.

Figure 5:
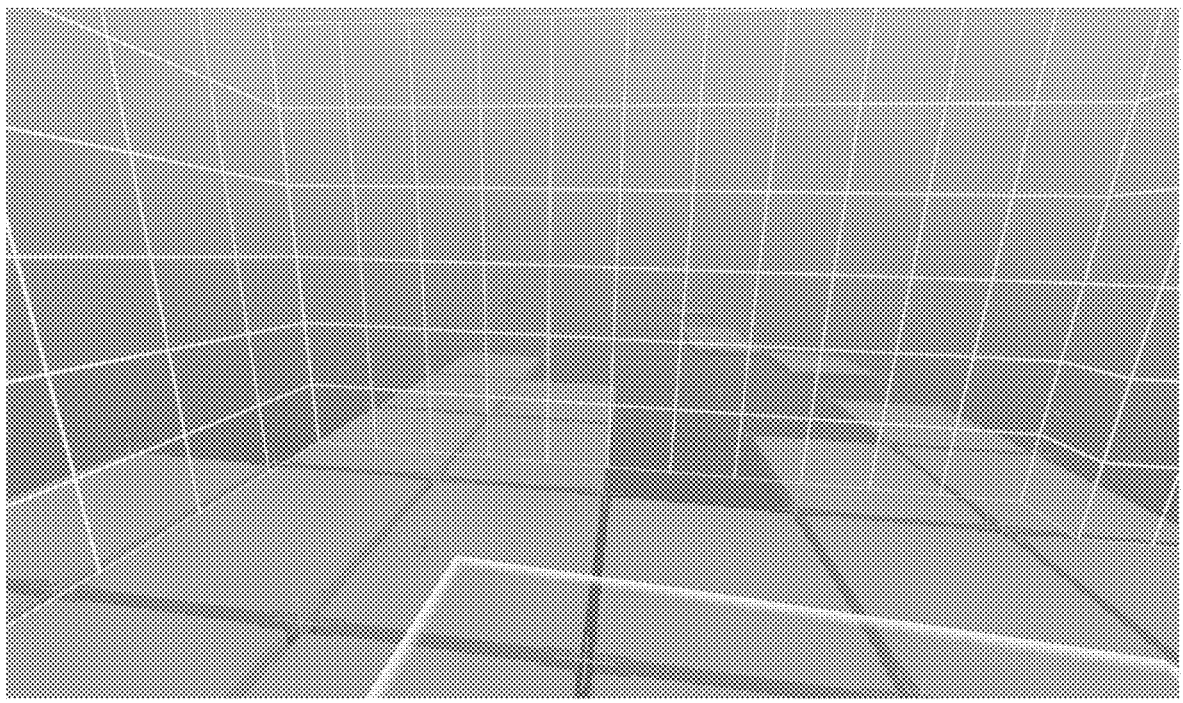
FIG. 5 depicts an exemplary display according to certain embodiments, in which soft bounds are visible on the floor as a translucent polygon and have been defined by the player, and in which hard bounds are visible as a grid of glowing lines that indicate the position of a physical wall in a player's real-life space.

FIG. 5 depicts an exemplary display according to certain embodiments, in which soft bounds are visible on the floor as a translucent polygon and have been defined by the user, and in which hard bounds are visible as a grid of glowing lines that indicate the position of a physical wall in a user's real-life operating space.

Figure 6:
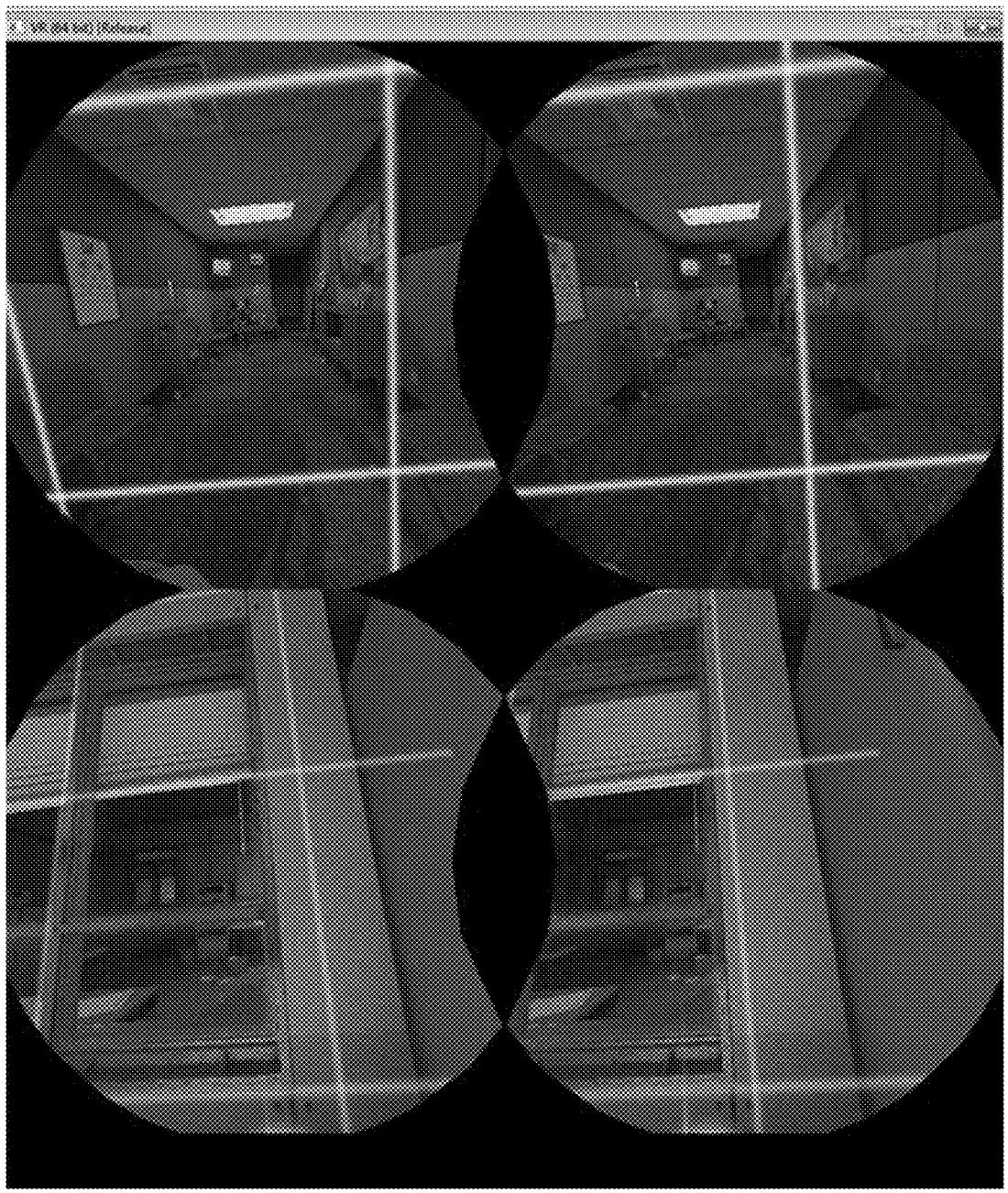
FIG. 6 depicts an exemplary display according to certain embodiments, in which two in-headset views of hard-bounds chaperoning systems are shown, warning a user of an impending collision, and in which the depicted grids indicate real-world wall positions.

FIG. 6 depicts an exemplary display according to certain embodiments, in which two in-headset views of hard-bounds chaperoning systems are shown, warning a user of an impending collision, and in which the depicted grids indicate real-world wall positions.

Figure 7:
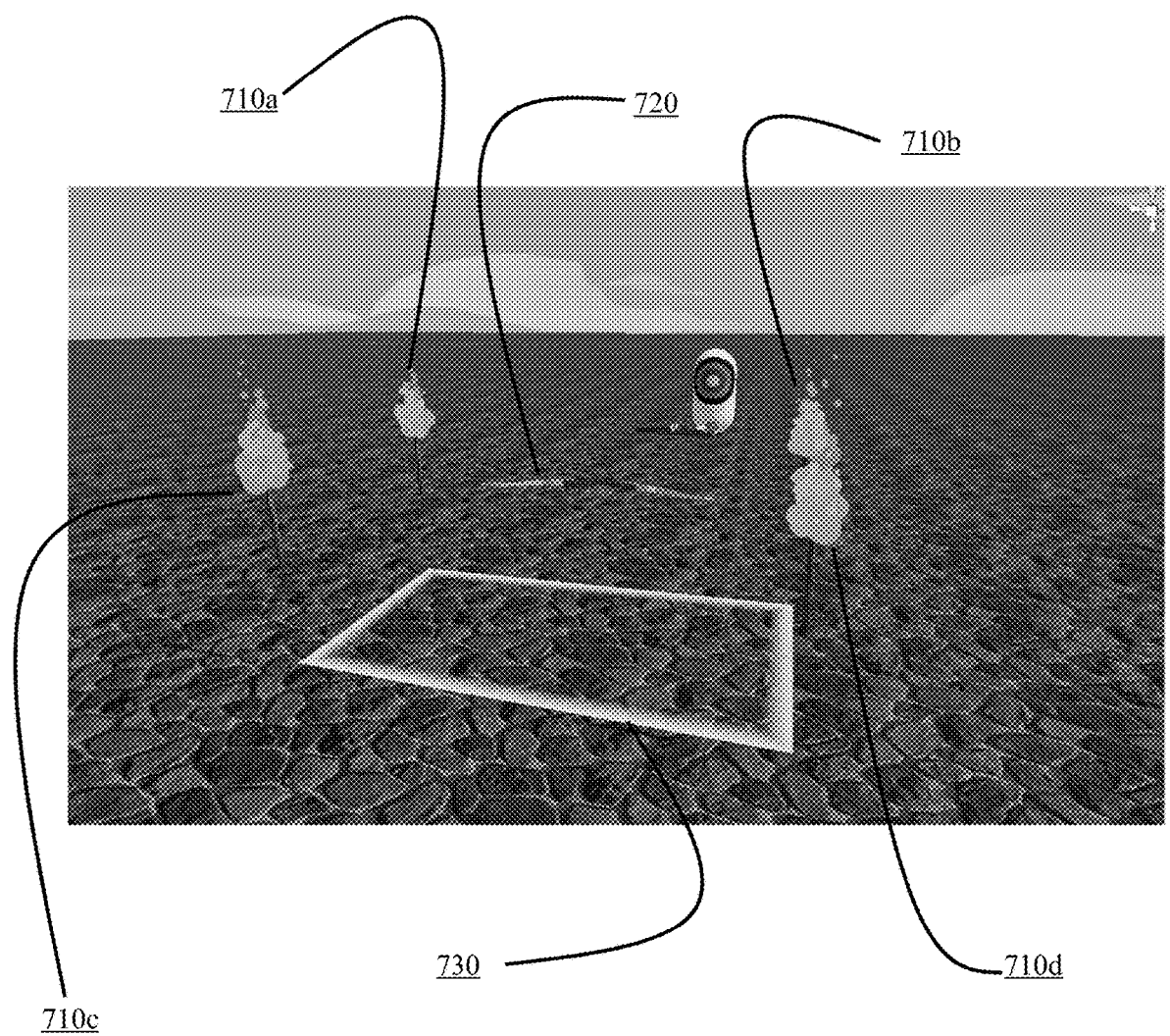
FIG. 7 depicts an exemplary display according to certain embodiments, depicting an example of using soft bounds data for placement of other elements in a game scene that help frame the player's experience.

FIG. 7 depicts an exemplary display according to certain embodiments, depicting an example of using soft bounds data for placement of other elements in a game scene that help frame the player's experience. In the scene shown in FIG. 7, torches (710a, 710b, 710c, 710d) are automatically placed at the bounds corners, regardless of how a user may have configured them. The bow (720) shown in FIG. 7 is placed at the leading edge of the user's soft bounds (730), in the user's preferred direction of play. Certain embodiments according to the arrangement shown in FIG. 7 automatically scale and adjust to a individual user's soft-bound settings.

In certain implementations, the appearance of chaperoning bounds according to aspects of the present invention may reduce the sense of immersion that a user experiences in a virtual environment. This can be addressed by the following solutions, either separately or in combination, depending on the requirements of each particular implementation:

First, chaperoning bounds are not displayed at full brightness immediately, but instead are slowly faded in as a user closes in on the actual bounds of the user's real environment ("operating space"). Independent fade value may be computed for each wall, then a fifth fade value (assuming an exemplary typical operating space in a room with four walls) is applied to a perimeter mesh that is the outer edges of the space in which the user is standing (e.g., this may appear as the edges of a cube highlighted). The fifth fade value in one embodiment may be implemented as the maximum value of the fade values for each of the four walls. In this way, if a user is backing into a wall, the perimeter mesh will light up full bright. In certain embodiments, to assist a user to see the other of the walls as the user backs into a wall, the fade values may intentionally bleed slightly into their neighboring walls and slightly into the opposite wall. This technique allows a user to see the location of all walls without the chaperoning alerts becoming overwhelming. In certain embodiments, to increase the sense of immersion, after the brightest chaperoning bounds are activated and displayed at full brightness for some period of time (e.g, 4 seconds), the brightness of all chaperoning alerts is slowly faded to 20% of the original brightness.

Second, only the bounds of the wall closest to user are shown at full intensity (e.g., as a glowing grid), while the other walls are only shown as their outlines/outer corners. Third, the intensity of the chaperoning bounds may be defined relative to the brightness of the virtual environment they are superimposed on. This underlying brightness can either be measured live based on the rendered virtual environment, or provided by the game driving the experience through an API. Fourth, after a user has stood still in one place for a few seconds and has gotten to understand where the bounds are, chaperone bounds may be automatically faded out so that user can experience the VR environment undisturbed in spite of being close to a wall.

In certain implementations, chaperoning alert systems according to aspects of the present invention may show a warning too late for a user to stop before a collision if the user is moving too quickly. This can be addressed by the following solutions, either separately or in combination, depending on the requirements of each particular implementation:

First, the chaperoning warnings may be shown earlier intentionally. However, this may have the undesirable effect of making the usable space in which a user can experience VR smaller. Second, the velocity and/or acceleration of tracked objects (e.g., the user's HMD apparatus and/or related handheld controllers) may be measured, and the chaperone bounds may be shown sooner or later based on the outcome of these measurements. Third, the risk of rapid movement and therefore the speed/intensity of the display of chaperoning warnings may be derived from heuristics. For example, systems according to aspects of the present invention may measure how users generally experience a specific VR experience (e.g., is it one in which slow exploration is typical, or one in which fast movement is typical?). Also, if an exemplary system is designed to identify a user (e.g., by login, eye tracking cameras, height, typical motion patterns, etc.) it can base its warnings on how quickly this particular user typically moves and reacts to chaperone warnings. Fourth, if a game/application does not actually need a large use space, chaperone warnings can be more aggressive since the need for maximization of space is lower.

In certain implementations, initial room setup according to aspects of the present invention may be perceived as relatively manual and unintuitive. This can be addressed by the following solutions, either separately or in combination, depending on the requirements of each particular implementation:

First, a user can simply walk around in the real operating space, holding his or her controller and moving it along some or all of the walls/floor/ceiling of the operating space. The measurements taken via this process are transmitted to the chaperoning system controller using any appropriate technique, as known to skilled artisans. Based on these absolute measured positions, the systems according to aspects of the present invention then calculate the smallest polyhedron that contains all of the positions in which the controller has been detected. Second, rangefinders of various types that are known to skilled artisans (e.g., ultrasound, laser) may be integrated into particular implementations, and these may generate the necessary information regarding the boundaries of the operating space, with little or no intervention required by a user.

In certain embodiments, extending the concept of the independently controlled persistent ground perimeter, wall styles may be separated from perimeter styles, where the perimeter includes the vertical wall separators, ceiling outline, and ground outline. Perimeter styles could be a subset of:
1. Dynamic perimeter
2. Dynamic perimeter with persistent ground outline
3. Persistent ground outline only
4. Dynamic ground outline only (for the true minimalist who knows his or her space very well)
5. None In certain embodiments, users may select the invasiveness, aggressiveness, fade distance, and/or color scheme of the chaperoning bounds that are displayed, via any suitable user interface and/or configuration utility using techniques that are known to skilled artisans. For example, in terms of color scheme selection, a suitable palette of colors may be predetermined from which a user may select, or users may be permitted to choose hue and/or saturation, while brightness is generated by systems according to aspects of the present invention. Moreover, user selections may be adjusted and/or saved, depending on particular games or applications.

Figure 8:
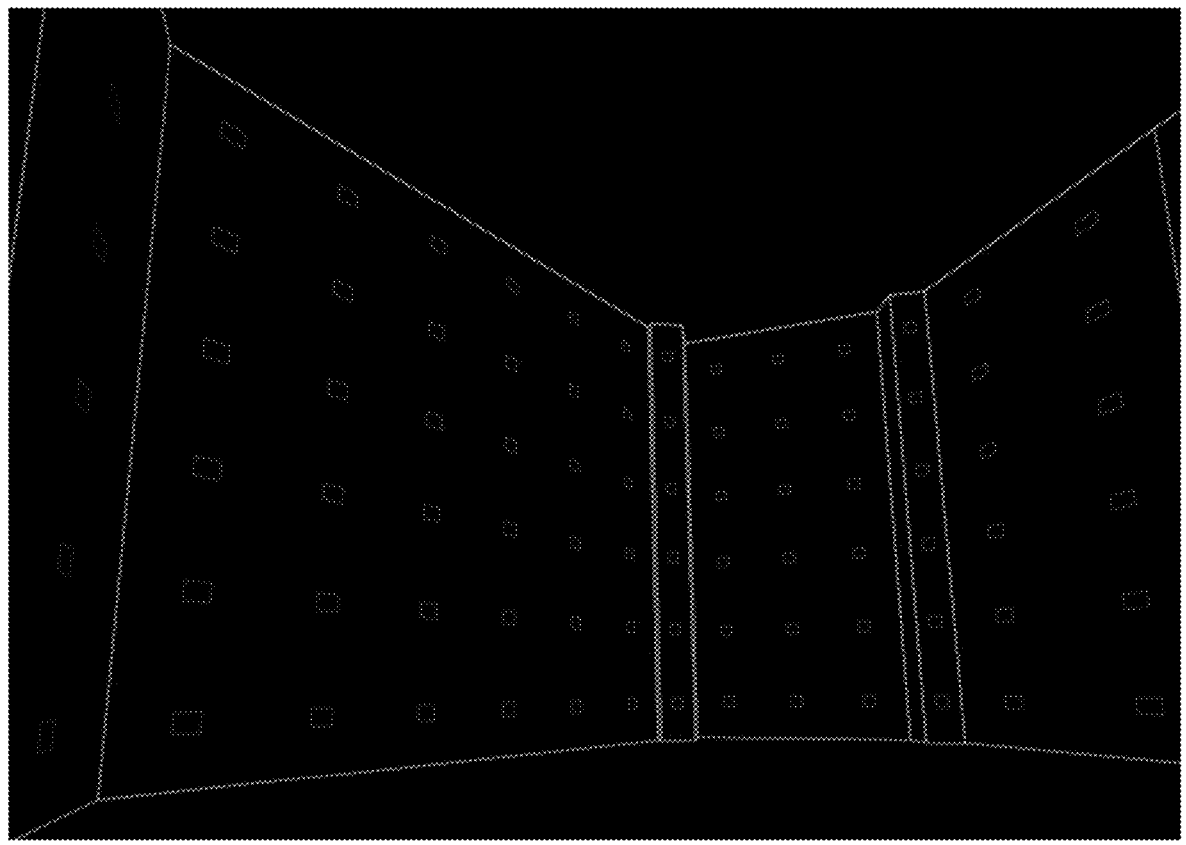
FIG. 8 depicts an exemplary display according to certain embodiments, depicting an example of rendering a pattern on the walls of a virtual space to visually alert a user as to the location of physical boundaries in the real operating space surrounding the user.

FIG. 8 depicts an exemplary display according to certain embodiments, depicting an example of rendering a square pattern on the walls of a virtual space to visually alert a user as to the location of physical boundaries in the real operating space surrounding the user.

Figure 9:
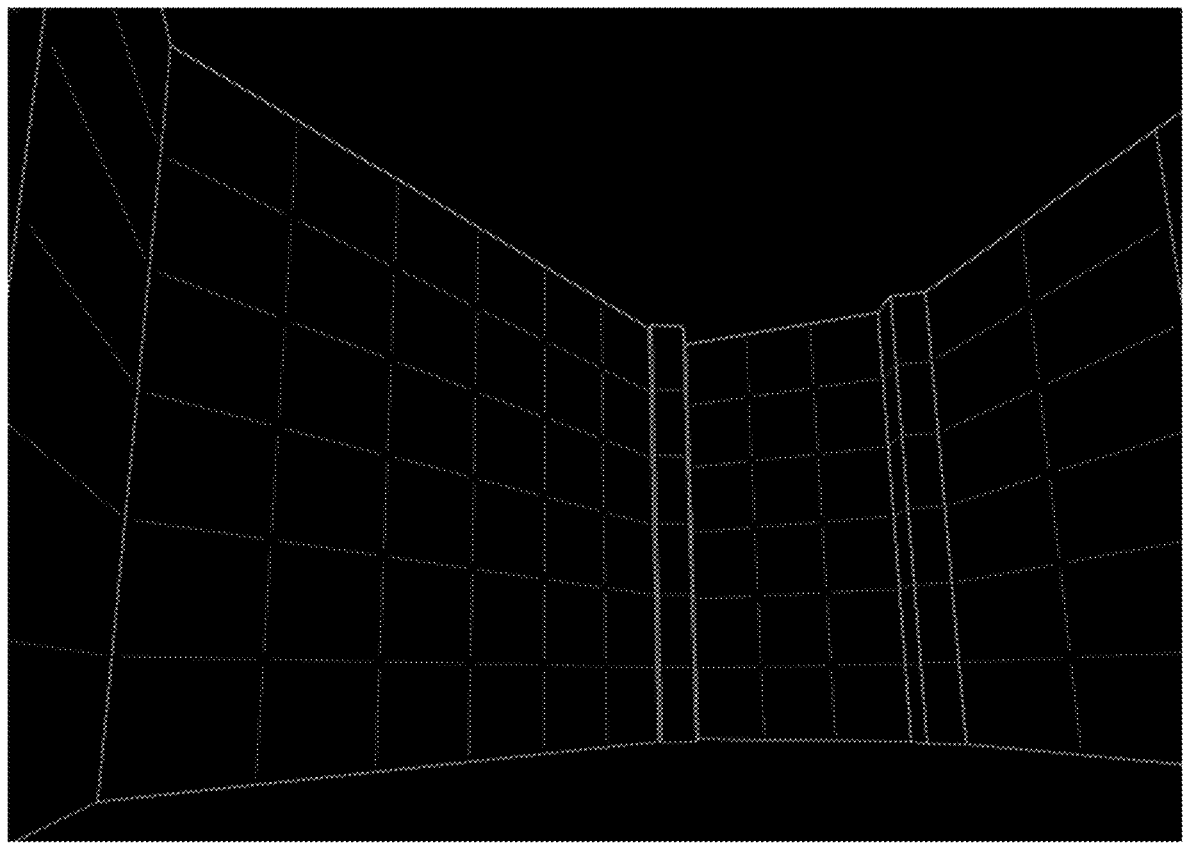
FIG. 9 depicts an exemplary display according to certain embodiments, depicting another example of rendering a pattern on the walls of a virtual space to visually alert a user as to the location of physical boundaries in the real operating space surrounding the user.

FIG. 9 depicts an exemplary display according to certain embodiments, depicting another example of rendering a grid pattern on the walls of a virtual space (with the intersections removed) to visually alert a user as to the location of physical boundaries in the real operating space surrounding the user.

Figure 10:
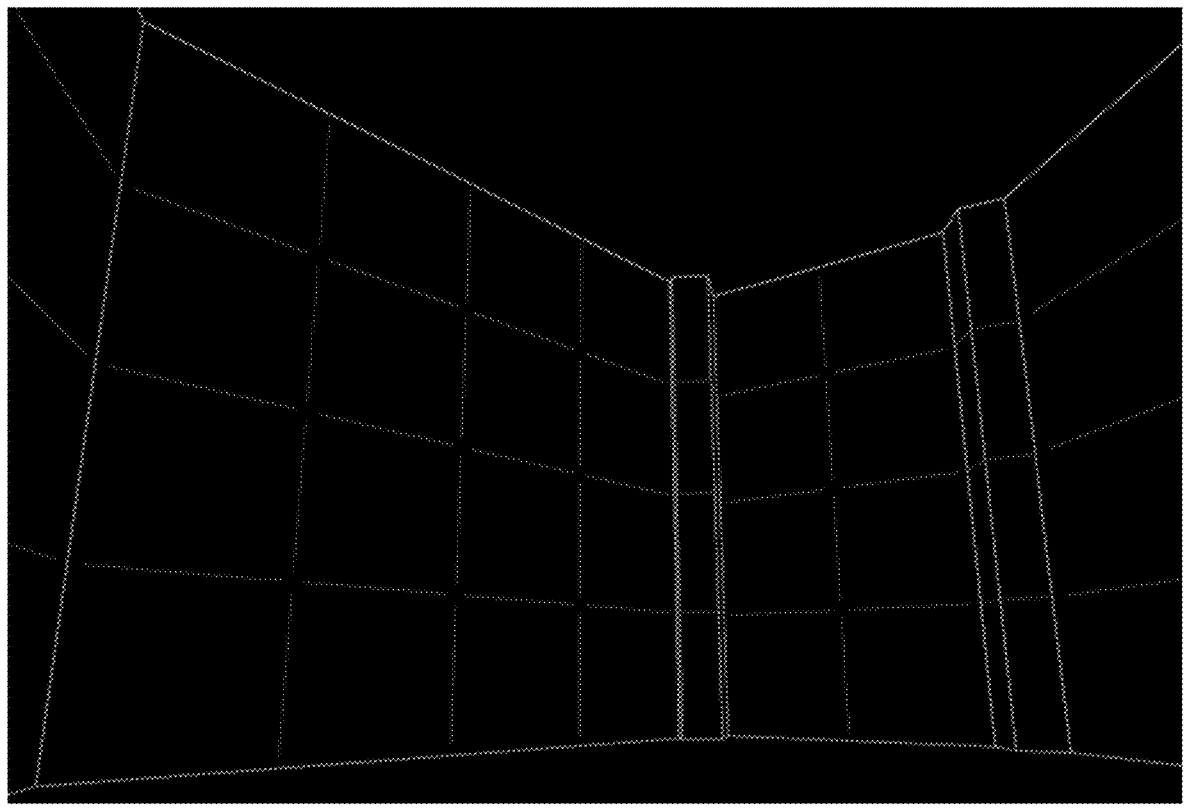
FIG. 10 depicts an exemplary display according to certain embodiments, depicting another example of rendering a pattern on the walls of a virtual space to visually alert a user as to the location of physical boundaries in the real operating space surrounding the user.

FIG. 10 depicts an exemplary display according to certain embodiments, depicting another example of rendering a pattern on the walls of a virtual space to visually alert a user as to the location of physical boundaries in the real operating space surrounding the user. This is similar to the pattern shown in FIG. 9, but the square openings are approximately 2.25 times greater in area (i.e., the bars are spaced 1.5 times farther apart).

Figure 11:
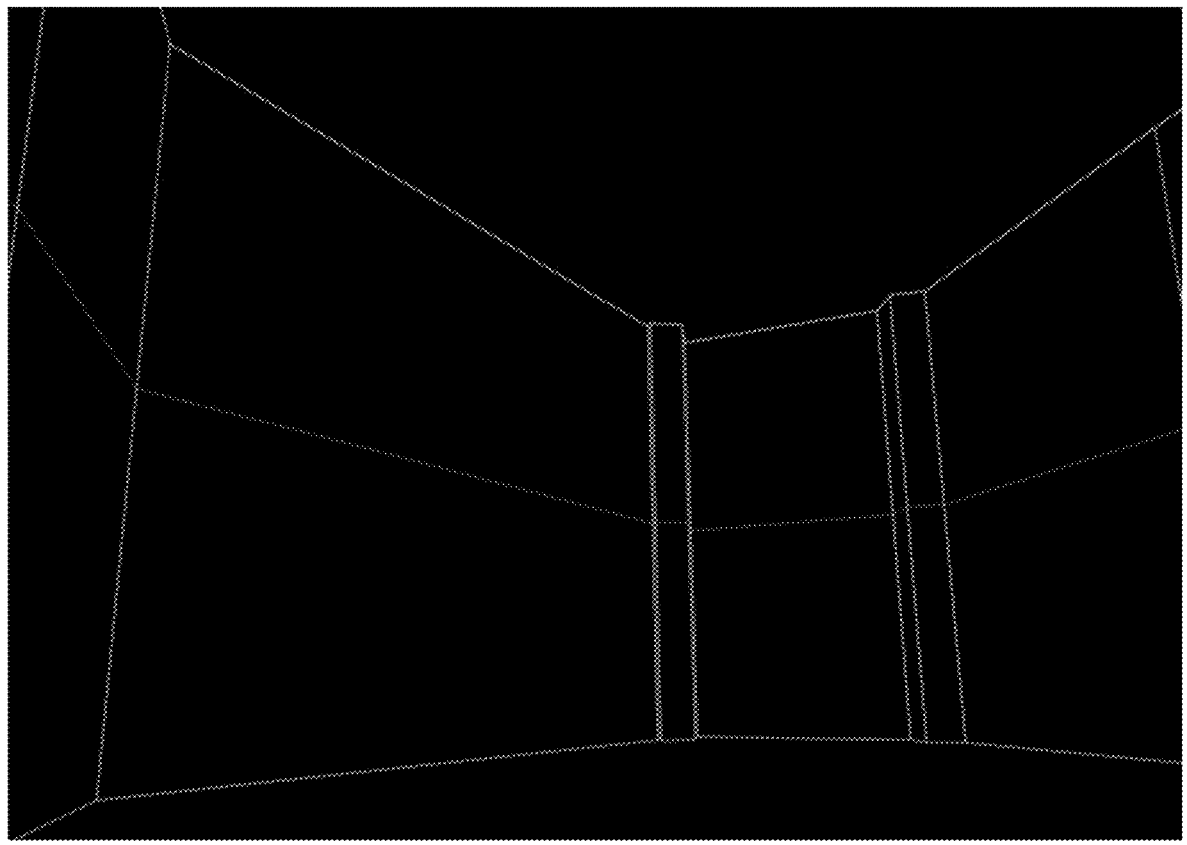
FIG. 11 depicts an exemplary display according to certain embodiments, depicting another example of rendering a pattern on the walls of a virtual space to visually alert a user as to the location of physical boundaries in the real operating space surrounding the user.

FIG. 11 depicts an exemplary display according to certain embodiments, depicting another example of rendering a pattern on the walls of a virtual space (i.e., a single horizontal line on each wall) to visually alert a user as to the location of physical boundaries in the real operating space surrounding the user.

Figure 12:
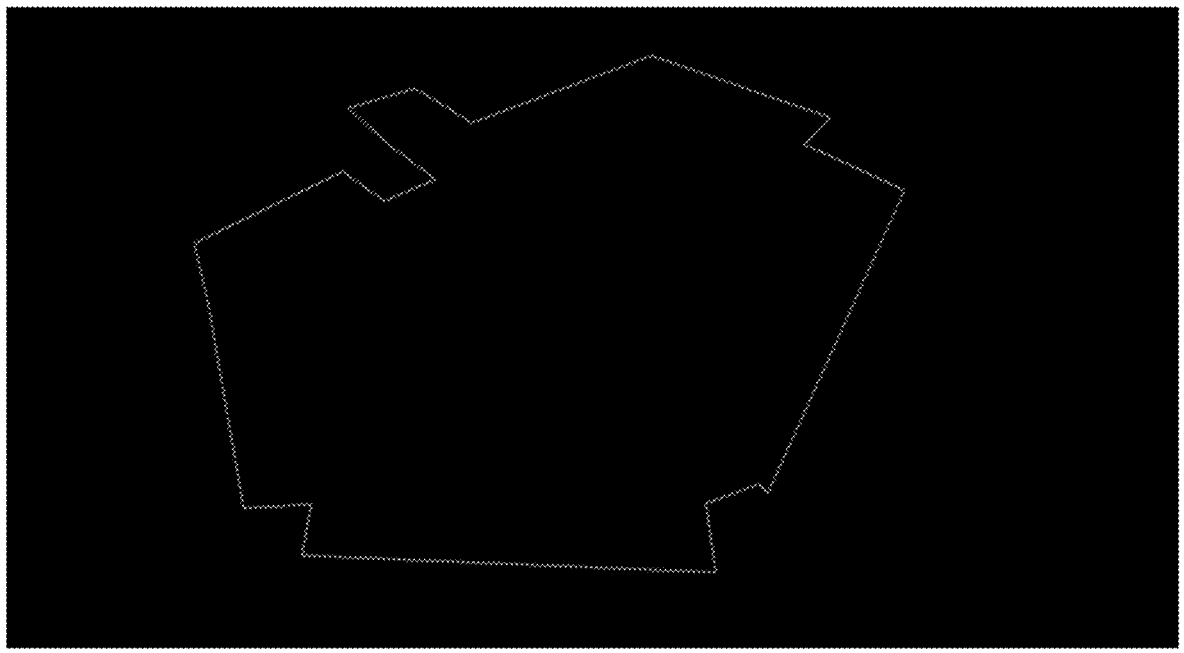
FIG. 12 depicts an exemplary display according to certain embodiments, depicting an example of rendering a pattern on the floor of a virtual space to visually alert a user/developer as to the location of physical boundaries in the real operating space surrounding the user.

FIG. 12 depicts an exemplary display according to certain embodiments, depicting an example of rendering a pattern on the floor of a virtual space to visually alert a user/developer as to the location of physical boundaries in the real operating space surrounding the user. Depending on the requirements of each particular implementation, this may be displayed as a persistent line loop at floor-level that never fades away, to assist a user or developer to always be aware of where the walls are located within the operating space simply by glancing down.

While the above description contains many specifics and certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art, as mentioned above. The invention includes any combination or subcombination of the elements from the different species and/or embodiments disclosed herein.

We claim:
1. A method for warning a user of a head-mounted display of potential collisions with obstacles, comprising:
 detecting first locations of an object at a plurality of points in time while the user moves the object around a real operating space to define a boundary of the real oper- ating space, wherein defining the boundary includes calculating a smallest polyhedron based on the first locations of the object detected at the plurality of points in time;

monitoring a second location of the user within the real operating space;

performing a detection to determine when a distance between the second location of the user relative to the boundary is smaller than a predetermined alarm threshold; and in response to the detection, triggering an alarm on the head-mounted display to provide an indication to the user of a potential collision with the obstacles.

2. The method of claim 1, wherein the alarm is a visual alarm or an audible alarm that is accompanied by a vibratory alarm on the head-mounted display if the detection determines that the distance between the second location of the user relative to the boundary is smaller than a second predetermined alarm threshold.

3. The method of claim 1, further comprising increasing an intensity of the alarm as the user gets closer to the boundary based at least in part on determining that the distance between the second location of the user relative to the boundary is smaller than the predetermined alarm threshold.

4. The method of claim 1, further comprising:
monitoring a third location of the object held by the user within the real operating space; and
performing a second detection to determine when a second distance between the third location of the object relative to the boundary is smaller than the predetermined alarm threshold.

5. The method of claim 4, wherein the alarm is a visual alarm, the method further comprising displaying the visual alarm on the head-mounted display to provide a second indication to the user of a second potential collision with the obstacles.

6. The method of claim 1, further comprising:
detecting an issuance of a repositioning command from the user; and
repositioning a virtual representation of the user in a virtual space.

7. The method of claim 1, wherein the alarm is a visual alarm, the method further comprising reducing a brightness of the visual alarm after a predetermined period of time.

8. The method of claim 1, wherein detecting the first locations of the object occurs while the user walks around the real operating space holding the object.

9. A method for warning a user of a head-mounted display of potential collisions with obstacles, comprising:
detecting first locations of an object at a plurality of points in time while the user moves the object around a real operating space to define a boundary of the real operating space;
dynamically repositioning a virtual representation of the user in a virtual space that is larger than the real operating space;
monitoring a second location of the object held by the user within the real operating space;
performing a detection to determine when a distance between the second location of the object relative to the boundary is smaller than a predetermined alarm threshold; and
in response to the detection, triggering an alarm on the head-mounted display to provide an indication to the user of a potential collision with the obstacles.

10. The method of claim 9, wherein, if the detection determines that the distance between the second location of the object relative to the boundary is smaller than the predetermined alarm threshold, the alarm increases in intensity as the object gets closer to the boundary.

11. The method of claim 10, wherein the alarm is a visual alarm or an audible alarm that is accompanied by a vibratory alarm on the object if the detection determines that the distance between the second location of the object relative to the boundary is smaller than a second predetermined alarm threshold.

12. The method of claim 9, wherein the alarm is a visual alarm, the method further comprising reducing a brightness of the visual alarm after a predetermined period of time.

13. A system for warning a user of a head-mounted display of potential collisions with obstacles, comprising:
one or more location-defining circuits for detecting first locations of an object at a plurality of points in time while the user moves the object around a real operating space to define a boundary of the real operating space, wherein defining the boundary includes calculating a polyhedron based on the first locations of the object detected at the plurality of points in time; and
one or more circuits for user-location monitoring that monitor a second location of the user within the real operating space, perform a detection to determine when a distance between the second location of the user relative to the boundary is smaller than a predetermined alarm threshold, and in response to the detection, trigger an alarm on the head-mounted display to provide an indication to the user of a potential collision with the obstacles.

14. The system of claim 13, further comprising one or more circuits for object-location monitoring that monitor a third location of the object held by the user within the real operating space, perform a second detection to determine when a second distance between the third location of the object relative to the boundary is smaller than the predetermined alarm threshold, and, in response to the second detection, trigger the alarm on the head-mounted display to provide a second indication to the user of a second potential collision with the obstacles.

15. The system of claim 14, wherein, if the detection determines that the distance between the second location of the user relative to the boundary is smaller than the predetermined alarm threshold, the alarm increases in intensity as the user gets closer to the boundary.

16. The system of claim 15, wherein the alarm is a visual alarm or an audible alarm that is accompanied by a vibratory alarm on the object if the second detection determines that the second distance between the third location of the object relative to the boundary is smaller than a second predetermined alarm threshold.

17. The system of claim 14, wherein, if the second detection determines that the second distance between the third location of the object relative to the boundary is smaller than the predetermined alarm threshold, the alarm increases in intensity as the object gets closer to the boundary.

18. The system of claim 13, wherein the alarm is accompanied by a vibratory alarm on the head-mounted display if the detection determines that the distance between the second location of the user relative to the boundary is smaller than a second predetermined alarm threshold.

19. The system of claim 13, further comprising one or more circuits for display repositioning that detect an issuance of a repositioning command from the user and, in response, reposition a virtual representation of the user in a virtual space.

20. The system of claim 13, wherein the alarm is a visual alarm and the one or more circuits for user-location monitoring reduce a brightness of the visual alarm after a predetermined period of time.

\* \* \* \* \*